US010306057B1

(12) United States Patent
Sasso

(10) Patent No.: US 10,306,057 B1
(45) Date of Patent: May 28, 2019

(54) AUTOMATIC CALL BLOCKING AND ROUTING SYSTEM AND METHOD

(71) Applicant: William Sasso, Reno, NV (US)

(72) Inventor: William Sasso, Reno, NV (US)

( * ) Notice: Subject to any disclaimer, the term of this patent is extended or adjusted under 35 U.S.C. 154(b) by 0 days.

(21) Appl. No.: 15/401,403

(22) Filed: Jan. 9, 2017

Related U.S. Application Data

(60) Provisional application No. 62/276,133, filed on Jan. 7, 2016.

(51) Int. Cl.
*H04M 3/436* (2006.01)
*H04M 3/527* (2006.01)
*H04M 3/42* (2006.01)
*H04M 1/00* (2006.01)
*H04M 9/00* (2006.01)

(52) U.S. Cl.
CPC ........ *H04M 3/436* (2013.01); *H04M 3/42059* (2013.01); *H04M 3/42153* (2013.01); *H04M 3/527* (2013.01); *H04M 2203/2072* (2013.01); *H04M 2203/657* (2013.01); *H04M 2250/02* (2013.01)

(58) Field of Classification Search
CPC ........ H04M 1/72561; H04M 2207/18; H04M 2207/20; H04M 3/42314; H04M 11/007; H04M 1/72577; H04M 1/72583; H04M 1/7253; H04M 1/72533; H04M 2250/22; H04M 3/42229; H04M 1/72519; H04M 2250/02; H04L 67/02; H04L 67/10; H04L 67/42; H04L 67/025; H04L 63/0853; G06F 21/35; G06F 3/017; G06F 3/0416; G06F 3/0481; G06F 3/0488; G06F 3/04883; G06F 3/04886; G06F 3/04817; G06F 3/0482; H04W 88/02; H04W 84/12; H04W 52/0258; H04W 68/005; H04W 4/16
USPC ............ 379/207.02, 207.03, 207.04, 207.06, 379/207.07, 207.1, 207.15, 210.02, 379/211.02, 210.03; 370/352, 353, 356
See application file for complete search history.

(56) References Cited

U.S. PATENT DOCUMENTS 5,291,545 A * 3/1994 Stahl ..................... H04M 1/745
379/377
5,490,210 A 2/1996 Sasso
(Continued)

OTHER PUBLICATIONS

Panasonic, Operating Instructions, Link-to-Cell Cellular Convergence Solution, published in 2010, pp. 19-27 and 54.

*Primary Examiner* — Ahmad F. Matar
*Assistant Examiner* — Kharye Pope
(74) *Attorney, Agent, or Firm* — Holland & Hart LLP

(57) ABSTRACT

An automatic call blocking and routing system. The system includes input and output ports, a telephone line interface and an off-hook circuit in communication with the input port, an output port, a switch in communication with the input and output ports, memory, a user-operable control, and a microprocessor responsive to the user-operable control to store in the memory data indicative of blocked callers. The microprocessor is responsive to an incoming call to compare the stored data with caller ID data in the incoming call. If the caller ID data matches a blocked caller, the microprocessor blocks the call by causing the off-hook circuit to send an off-hook signal to the input port, waiting a predefined interval of time, and then causing the off-hook circuit to send an on-hook signal to the input port.

24 Claims, 15 Drawing Sheets

(56) References Cited

U.S. PATENT DOCUMENTS

| | | | |
|---|---|---|---|
| 6,240,177 B1* | 5/2001 | Guntzburger | H04M 1/723 379/32.04 |
| 6,272,220 B1* | 8/2001 | Kincaid | H04M 1/003 379/379 |
| 6,625,270 B1* | 9/2003 | Banwell | H04M 1/663 379/142.01 |
| 6,687,512 B1* | 2/2004 | Shinozaki | H04M 11/06 375/222 |
| 6,700,957 B2 | 3/2004 | Horne | |
| 6,724,889 B1* | 4/2004 | Giles | H04M 1/82 379/377 |
| 6,785,383 B2 | 8/2004 | Fan et al. | |
| 7,953,214 B2 | 5/2011 | Horne | |
| 8,817,960 B2 | 8/2014 | Hodges et al. | |
| 2001/0033643 A1* | 10/2001 | Mulvey | H04M 1/663 379/196 |
| 2003/0063720 A1* | 4/2003 | Malinowski | H04L 12/14 379/93.01 |
| 2005/0195802 A1* | 9/2005 | Klein | H04L 12/6418 370/352 |
| 2005/0271197 A1* | 12/2005 | McClure | H04M 3/20 379/215.01 |
| 2006/0153176 A1* | 7/2006 | Caswell | H04L 12/6418 370/356 |
| 2006/0177030 A1* | 8/2006 | Rajagopalan | H04M 3/42263 379/142.07 |
| 2009/0092243 A1* | 4/2009 | Mitrea | H04M 3/005 379/412 |
| 2010/0205149 A1* | 8/2010 | Sekiya | G06F 11/1435 707/640 |
| 2013/0163490 A1* | 6/2013 | Rodriguez | H04L 29/06387 370/310 |
| 2014/0105373 A1* | 4/2014 | Sharpe | H04M 3/4365 379/142.05 |
| 2014/0369481 A1* | 12/2014 | Naito | H04N 1/32708 379/100.16 |
| 2015/0227249 A1* | 8/2015 | Kim | H04M 1/0214 345/173 |
| 2015/0288817 A1* | 10/2015 | Liu | H04M 3/4365 379/142.06 |

* cited by examiner

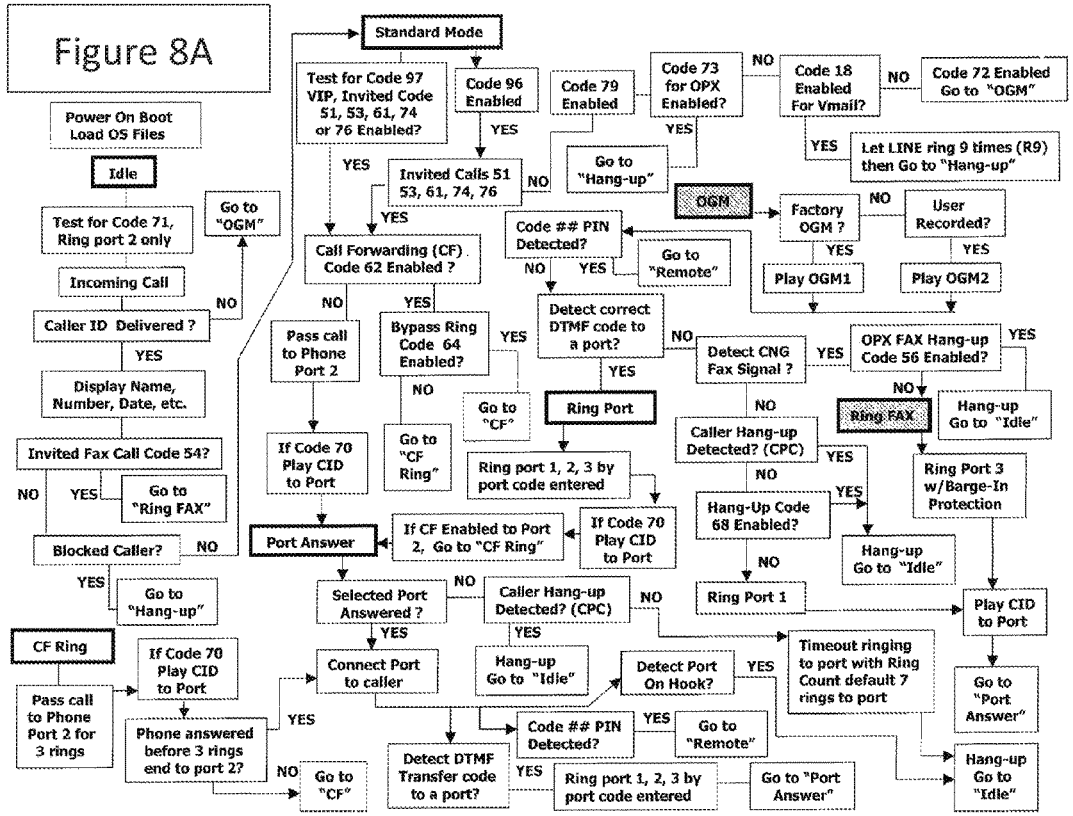

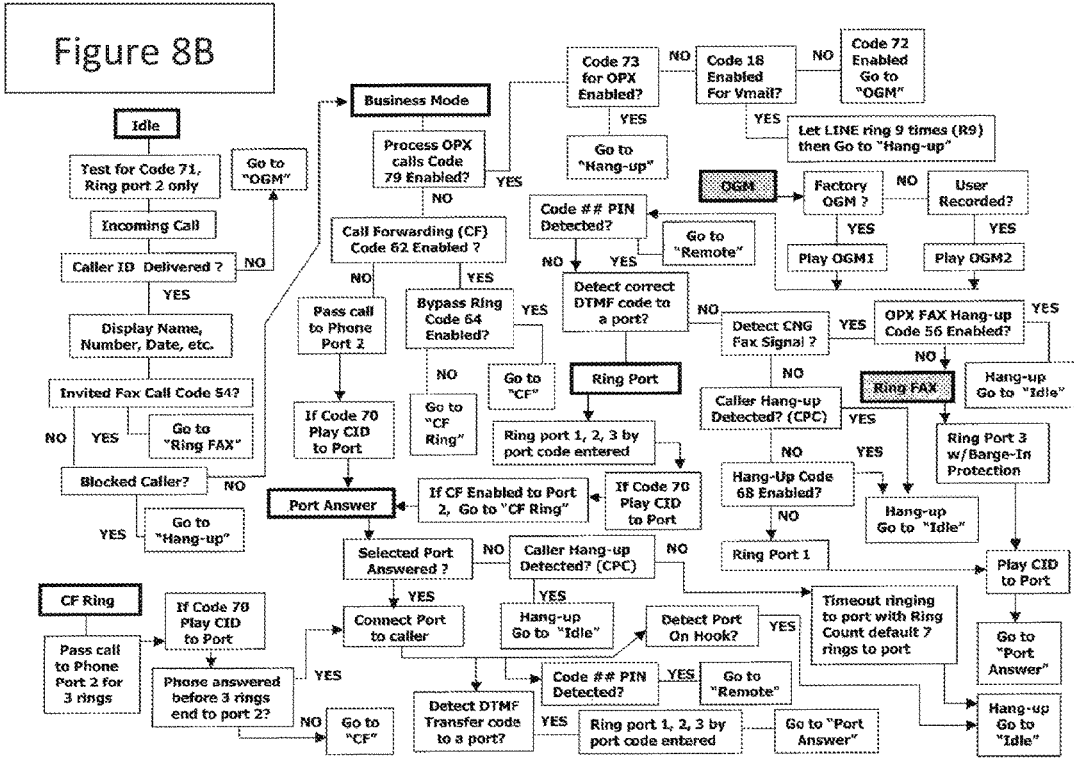

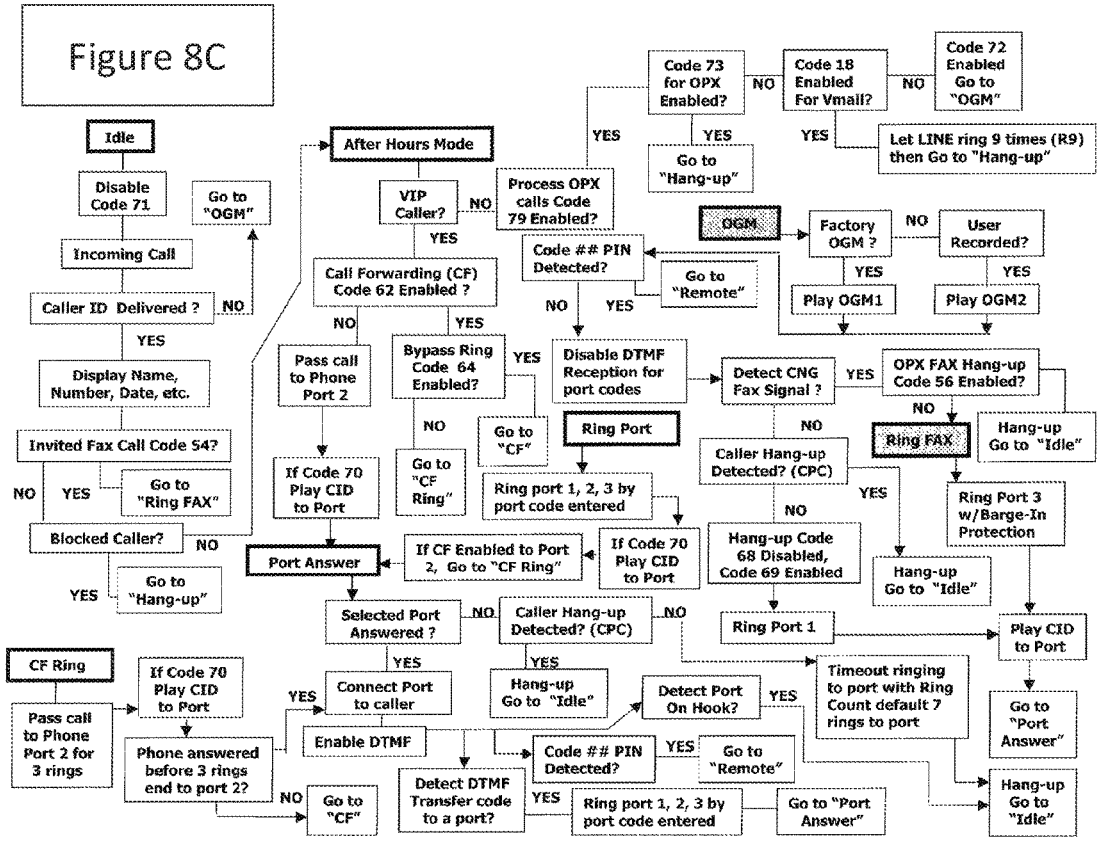

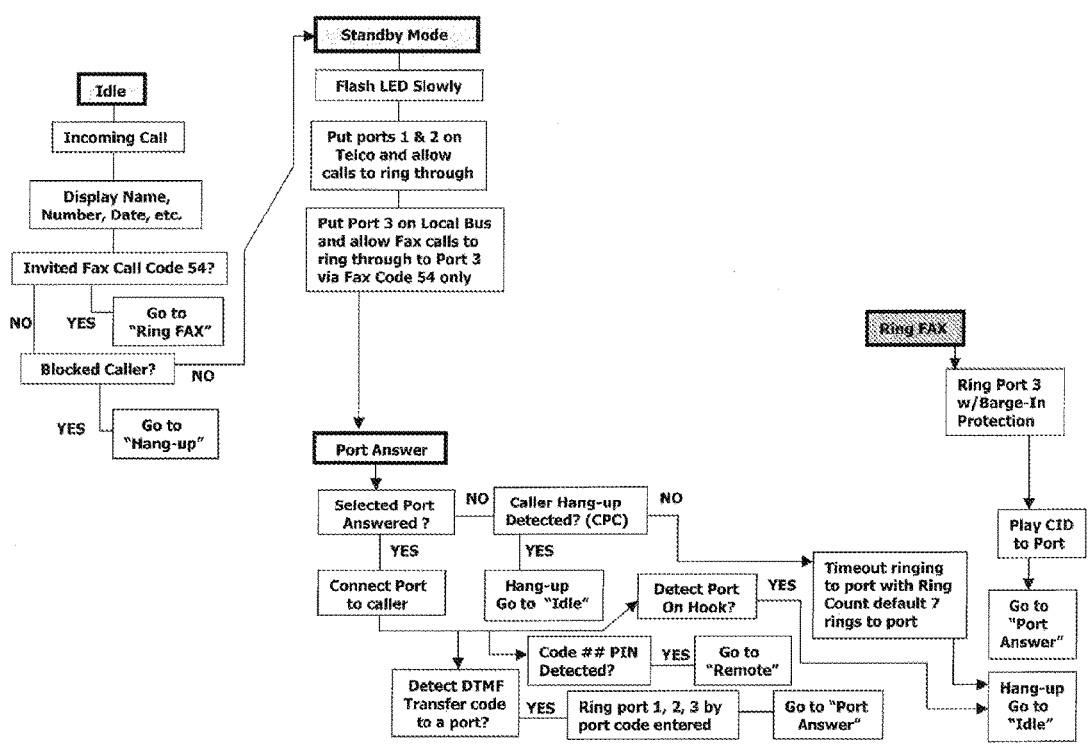

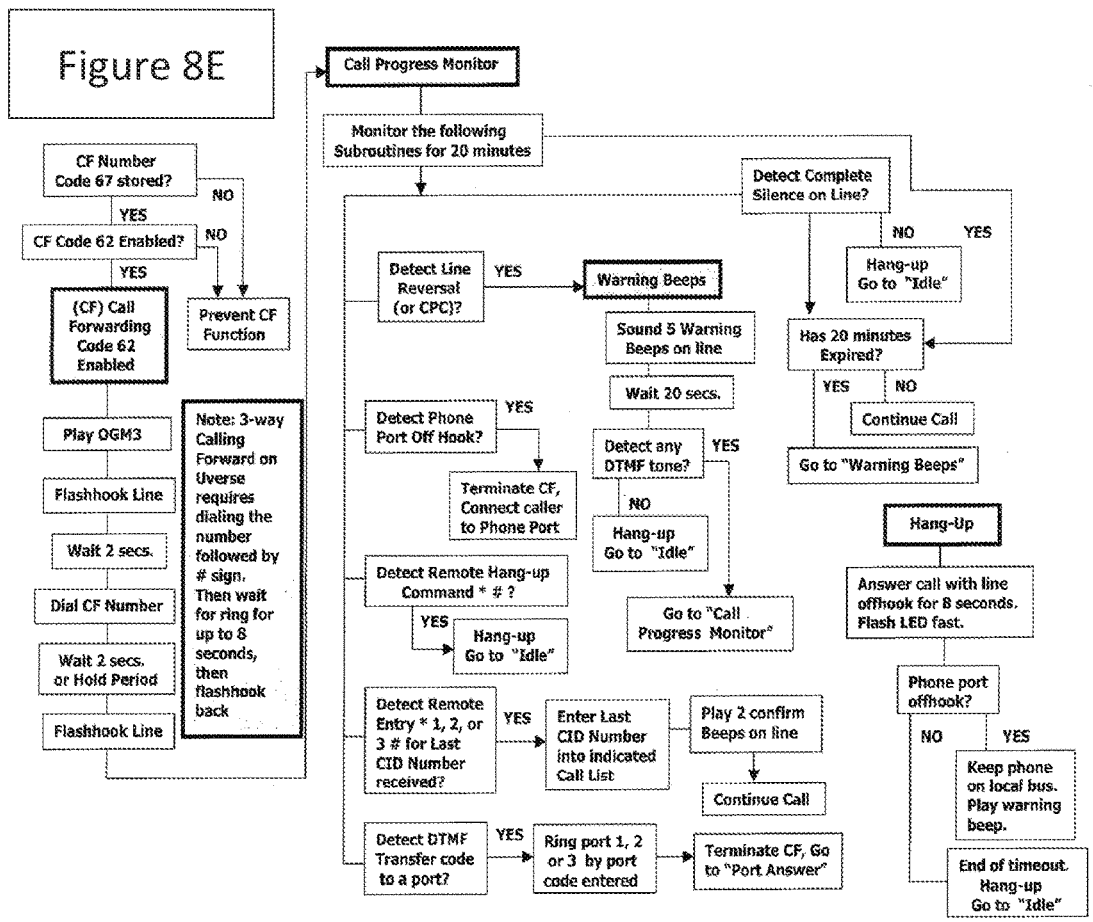

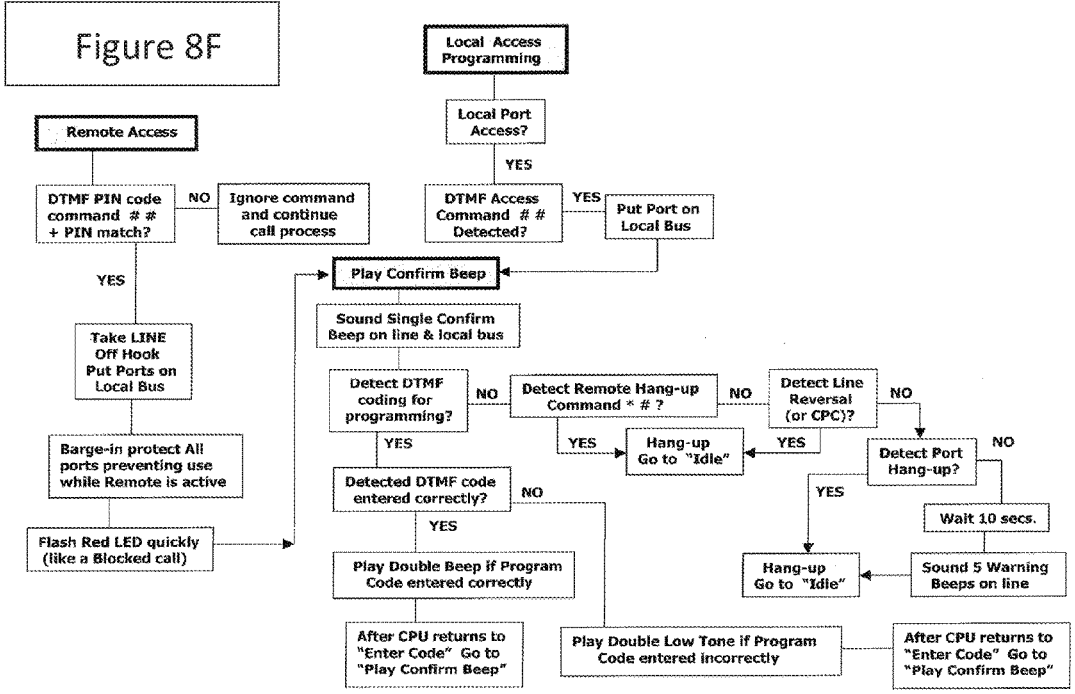

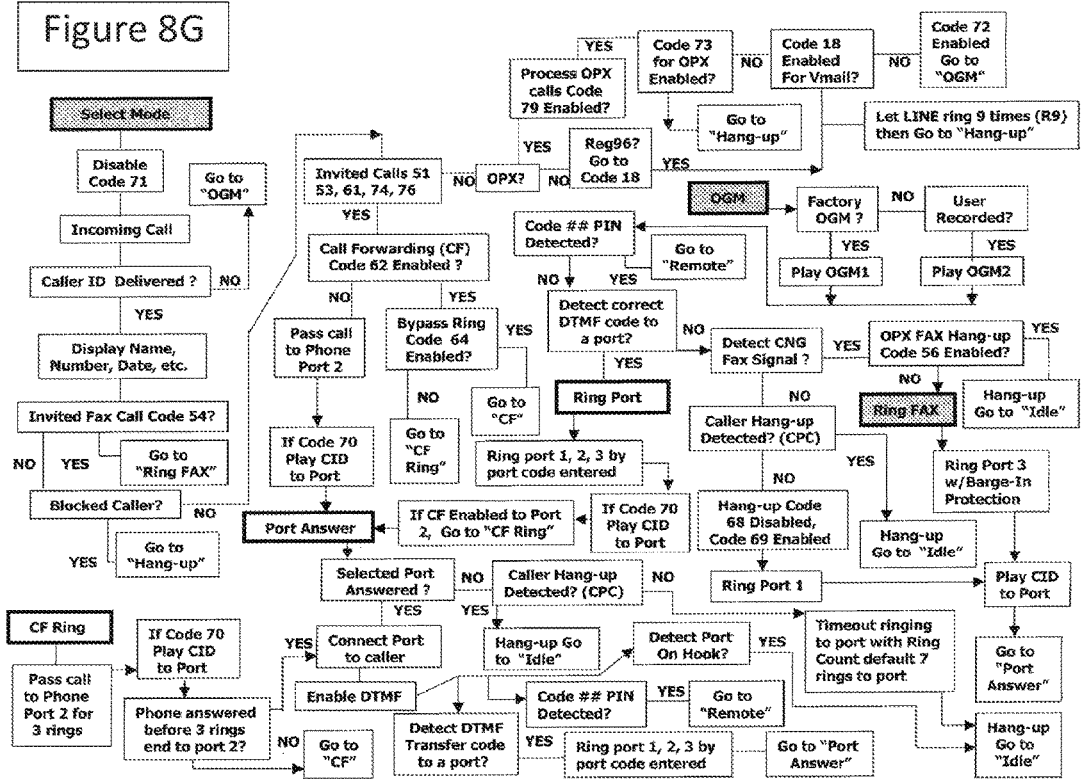

AUTOMATIC CALL BLOCKING AND ROUTING SYSTEM AND METHOD

CROSS-REFERENCE TO RELATED APPLICATIONS

This patent application claims priority from U.S. Provisional Patent Application Ser. No. 62/276,133 by the same inventor as the present application, titled "Automatic Call Blocker and Router," filed 7 Jan. 2016, the contents of which are incorporated herein by this reference. This patent application is generally related to U.S. Pat. No. 5,490,210 issued 6 Feb. 1996, the contents of which are incorporated herein by this reference.

FIELD

This invention relates generally to programmable telephone answering systems.

BACKGROUND

Telephone answering systems that automatically switch an incoming call to any of several telephone receivers and FAX machines are known. An example of such a system is disclosed in the above-mentioned U.S. Pat. No. 5,490,210.

Modern telephone systems send a caller ID signal, typically between the first and second ring signals, giving the telephone number from which a call is originating. The caller ID signal may be encoded by frequency shift keying (FSK) or dual tone multi frequency (DTMF) techniques.

The caller ID signal enables a telephone user who is receiving a call to determine the identity of the calling party before answering the phone. Typically this is done by observing the calling telephone number on an LCD screen on a control panel of the telephone. If the user does not wish to receive a call from the person whose number appears on the screen, the user may simply ignore the call.

Many telephone systems provide an option for special handling of calls received after business hours; this option may include automatically playing an outgoing message (OGM) to the caller to advise the caller of business hours during which a person may be available to take a call. The OGM may also invite the caller to leave a message which is thereupon stored. The OGM may also invite the caller to enter a predetermined code which rings directly through to connected telephone equipment associated with that code.

SUMMARY

The applicant has discovered disadvantages to the systems described above. The user may be busy on an important task, and even if the user elects to ignore the call after seeing who is calling, the noisy telephone ring and the need to look at the LCD screen interrupt the user and may disrupt the user's concentration on the task. The user may not remember the calling number as one the user wishes to ignore, especially if the user commonly receives calls from many different numbers, and the user thereupon answers the call only to discover too late that the caller is one the user does not wish to speak with. In a business setting, the user may wish to answer most calls only during business hours but may wish to answer calls from certain VIP callers such as family members at any time, and the user may wish to designate certain callers as after-hours callers with special privileges to call outside business hours. The user may also wish to block calls to, as well as from, certain telephone numbers, for example to protect family members who may be disabled from placing calls to aggressive sales people. Embodiments of an automatic call blocking and routing system provide unique solutions to these issues.

Briefly and in general terms, an automatic call blocking and routing system according to some embodiments includes an input port, a telephone line interface such as a Subscriber Line Interface ("SLIC") in communication with the input port, an off-hook circuit in communication with the input port, an output port, a switch in communication with the input and output ports, non-volatile memory or other memory in which data can be stored and later recalled, a user-operable control, and a microprocessor.

The microprocessor is responsive to the user-operable control to store in the memory data indicative of blocked callers. The microprocessor is responsive to an incoming call received from the input port through the telephone line interface to compare the stored data with caller ID data in the incoming call, and if the caller ID data matches a blocked caller, the microprocessor blocks the incoming call by causing the off-hook circuit to send an off-hook signal to the input port, waiting a predefined interval of time, for example 8 seconds, and then causing the off-hook circuit to send an on-hook signal to the input port. If the caller ID data does not match a blocked caller, the microprocessor causes the switch to connect the input port to the output port.

The input port may communicate with the switch and with the off-hook circuit by direct connection or through the telephone line interface. A telephone device such as a handset may be connected to the output port. When an incoming call is connected to the output port, the connected device may terminate the call by hanging up, or in some embodiments the microprocessor causes the off-hook circuit to terminate the call. In some embodiments the output port may include connections for several such devices and the switch connects the input port to one of them according to a code entered by a caller.

If it is desired to also block outgoing calls to blocked callers, the microprocessor will compare the telephone number to which an outgoing call is being directed with the data in the memory. In some embodiments the microprocessor will interrupt the call by causing the off-hook circuit to override the call by sending an on-hook signal. In other embodiments outgoing calls will be screened by the microprocessor before the switch connects the telephone device to the telephone line through the input port, and calls to blocked numbers will not be permitted to access the telephone line at all.

In some embodiments, causing the switch to connect the input port to the output port comprises temporarily storing the caller ID data in the memory; causing the switch to connect the input port to the output port; after one ring, causing the switch to disconnect the input port from the output port; sending the stored caller ID data to the output port; and causing the switch to again connect the input port to the output port. This enables the caller ID data to be passed through to the telephone device connected to the output port, so that even after the system has determined that the caller is not blocked, the user may still see who is calling and opt not to accept the call.

A telephone user may not wish to be bothered by calls from one or several specific individuals. Or the user may wish to exclude all calls from a certain telephone exchange or even from an entire area code. Through the user-operable control, the user may provide phone numbers, exchanges, and area codes from which calls are to be blocked. The user also can provide one or more phone numbers, exchanges, and groups of phone numbers from which the user wishes to receive calls; these may be designated as "invited". For example, the user may wish to block all calls from exchange 927 except for calls from the telephone number 927-8923, and in that case the user will designate exchange 927 as blocked and 927-8923 as invited.

Or the user might wish to block all calls from area code 303 except that the user wishes to receive all calls from exchanges 512 and 289 within that area code; the user would designate area code 303 as blocked and exchanges 512 and 289 within that area code as invited.

Responsive to the user, the microprocessor stores the blocked and invited numbers in memory, typically a non-volatile memory or some other configuration of memory that retains data. Then if a call arrives from a blocked number, exchange, area code, or predefined list, the system automatically blocks that call by answering, waiting the predefined interval of time, and hanging up, and the user is not bothered with it. The predefined interval of time may be 8 seconds to allow the subsequent hang-up to terminate the call and clear the line.

In some embodiments the user-operable control has color-coded push buttons for easy data entry. The control may have an LCD or other visual display with one or several lines of text; in some embodiments a 3-line display is used. The control may comprise the telephone keypad of a connected telephone device and the user enters data through a combination of the push buttons and the keypad of the device.

The memory may also contain a database of names and corresponding phone numbers so that the user may designate blocked or invited names as well as phone numbers. When an incoming call is received and the call is not one that is to be automatically blocked, the user-operable control may display the name, instead of or in addition to the calling number, making it easier for the user to determine whether to receive the call.

In some embodiments data are stored in the memory on a first-in, first-out basis. But the user may designate certain of the blocked numbers as permanent so that they cannot be deleted even if the memory fills up, unless a special command is used.

The input and output ports will typically be standard modular telephone jacks. The output port may include one or many connections for telephone devices, one or more of which may be reserved for FAX machines.

The input port is connected to a telephone interface unit such as a subscriber line interface (SLIC); an example of such a SLIC is the Si3217x by Silicon Labs of Austin, Tex. The output is not connected to the input, so the telephone device does not ring when a call arrives, until the microprocessor determines that the call is not blocked.

Some embodiments include a Bluetooth module communicable with a mobile phone or other input-output device. An app in the mobile phone may enable the user to provide data for storing in the memory. The app may automatically retrieve data from a contacts list in the phone, such that the user need only input a name of a person to be blocked or invited and the app will retrieve the corresponding phone number and provide it to the microprocessor. The Bluetooth module may allow full wireless control over the system and may provide full duplex communication with the input port.

Optionally, some callers may be identified as not only invited but also privileged. In this case, a call from a privileged caller may be specially processed according to a predefined protocol. For example, the privileged call may be routed to a specific telephone device, or to the user's mobile phone if the user is away.

The telephone interface unit may include an off-hook and on-hook signaling circuit. Or in some embodiments a separate off-hook and on-hook signaling circuit may be provided. One such circuit includes a rectifier in communication with the input port, a capacitor and a Zener diode in series connection across an output of the rectifier, and a Darlington optocoupler connected across the output of the rectifier, the Darlington optocoupler having an input connected to receive off-hook and on-hook signals from the microprocessor.

In some embodiments the output port includes a port for connecting an answering machine. Responsive to an incoming call, the answering machine may record a message from a caller. Or the microprocessor may itself perform the functions of an answering machine, digitizing a message from the caller and storing it in the memory until retrieved by the user.

In some embodiments the data stored by the user in the memory may include, in addition to blocked callers, any or all of VIP callers, after-hours callers, and predefined business hours. If the caller ID data matches a VIP caller, the microprocessor causes the switch to connect the input port to the output port. If the incoming call occurs during the predefined business hours, the microprocessor causes the switch to connect the input port to the output port. If the incoming call occurs outside the predefined business hours, the microprocessor plays a prerecorded outgoing message to the input port. If the incoming call occurs outside the predefined business hours and either (a) the caller ID data matches an after-hours caller or (b) the incoming call has no caller ID data, the microprocessor is responsive to a code provided in the incoming call to cause the switch to connect the input port to the output port. This code may designate a particular one of several connected telephone devices and in that case the microprocessor causes the switch to connect to the designated device.

In some embodiments the microprocessor is responsive to the user-operable control to store in the memory data indicative of special-privilege callers. A call from a special-privilege caller is connected to a predetermined telephone device through the output port.

The output port may comprise an answering-machine port, and the microprocessor may connect certain callers to that port, particularly if the call occurs outside business hours.

A method of automatically blocking and routing incoming telephone calls includes:
(A) storing data indicative of blocked callers;
(B) monitoring a telephone line;
(C) detecting an incoming call on the telephone line;
(D) extracting caller ID data from the incoming call;
(E) comparing the caller ID data with the stored data;
(F) if the caller ID data matches one of the blocked callers, blocking the call by sending an off-hook signal, waiting a predefined interval of time, and then sending an on-hook signal; and
(G) if the caller ID data does not match one of the blocked callers, connecting the incoming call to a telephone device.

Data indicative of blocked callers may include any of telephone numbers, names, area codes, and telephone exchanges.

The call may be automatically routed to a FAX machine if the incoming call includes a FAX tone CNG signal.

The method may include connecting the incoming call to a telephone device if the caller ID data matches a VIP caller or if the incoming call occurs during the predefined business hours. If the incoming call occurs outside of the predefined business hours, the method may include playing a prerecorded outgoing message. If the incoming call occurs outside the predefined business hours and either (a) the caller ID data matches an after-hours caller or (b) the incoming call has no caller ID data, the call may be connected to the telephone device according to a code provided in the incoming call. For example, the outgoing message may include a prompt to enter an extension number; certain callers may have been given a particular extension number, and if such a caller enters that number, the call will be connected accordingly.

The memory may be configured as a first-in, first-out data store, so that if the memory fills up and more data are presented for storage, the oldest data are deleted to make room. The user may designate some data as permanent, and data so designated will not be deleted unless a special command is given by the user.

Connecting the call to a telephone device may include forwarding the call to a mobile phone. This may be done for privileged callers, or for all callers except privileged ones whose calls are routed to a telephone device connected to an output port, or for every caller.

Other aspects of these and other embodiments will become apparent from the examples in the drawings and the following detailed description.

BRIEF DESCRIPTION OF THE DRAWINGS

FIGS. 8A through 8G depict a flowchart of another embodiment of an automatic call blocking and routing method.

DETAILED DESCRIPTION

Automatic Call Blocking and Routing System

Figure 1:
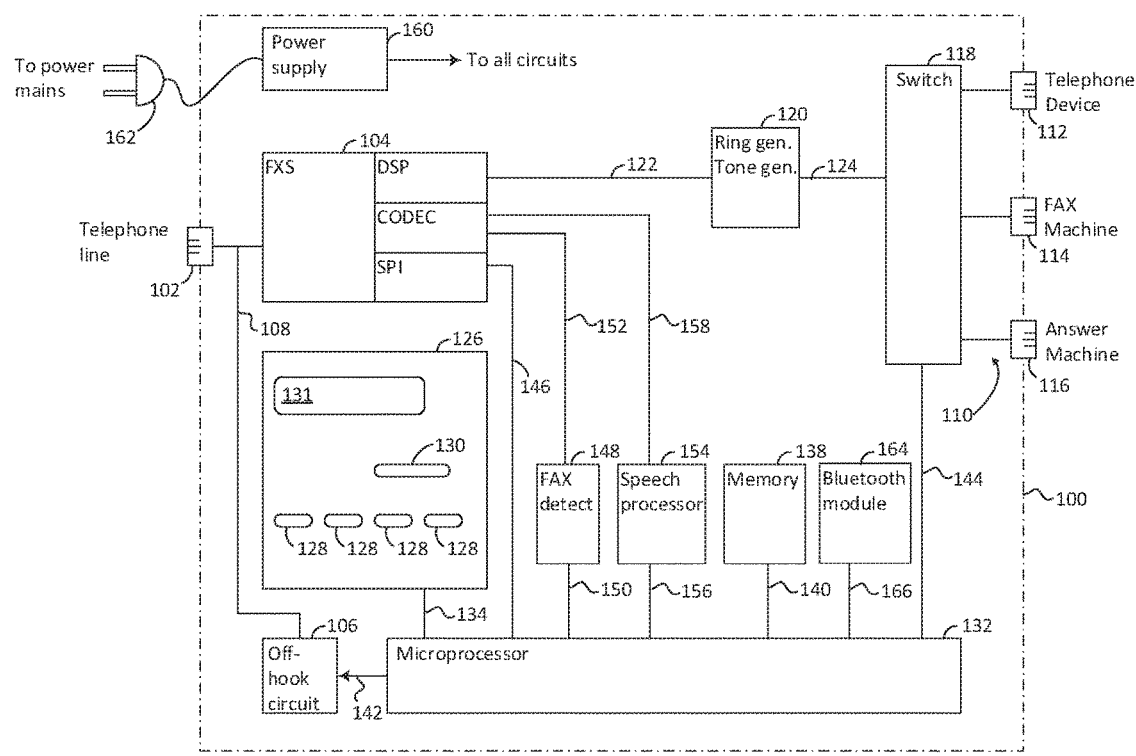
FIG. 1 is a block diagram of an embodiment of an automatic call blocking and routing system.

FIG. 1 illustrates one example of an automatic call blocking and routing system 100. This system includes an input port 102 which may be a modular telephone jack for connecting to a telephone line. An interface module 104 is in communication with the input port 102. In one example, the interface module 104 includes a DSP section, a CODEC section, an SPI section, and an FXS section. Although these sections are shown as separate units in this example, in other embodiments their functions may be combined or arranged differently.

In some embodiments the interface module 104 and its various sections are comprised in a Subscriber Line Interface model Si3217X distributed by Silicon Labs of Austin Tex. The FXS section receives signals from the telephone line, that is, from the PSTN Tip and Ring conductors. The SPI (bus) provides control lines for digital communication between devices. The CODEC can process recording and playback of outgoing messages (OGMs). The DSP can create ring generation and ring tones.

An off-hook signaling circuit 106, which may include PSTN protection, is in communication with the input port 102 as indicated by a line 108. An output port 110 may include a modular phone jack 112 or other connector for a telephone device. The output port 110 may include more than one such connector if more than one telephone device is to be used. The output port may include a connector 114 for a FAX machine, a connector 116 for an answering machine, or both.

A switch 118, which may be for example a double pole-double throw relay, a solid-state switch, a discrete MOSFET transistor switch, or other suitable device, when activated establishes a connection between the input port 102 and the output port 110 through the interface module 104 and a ring generator & tone generator module 120 as indicated by a line 122 from the interface module 104 to the ring generator & tone generator module 120 and a line 124 from the module 120 to the switch 118. In some embodiments the switch 118 may connect to the input port 102 either directly or through the ring generator & tone generator module 120.

A user-operable control 126 may include one or more push buttons such as four colored buttons 128, a button 130, and a visual display 131 such as a back-lighted LCD display of one, two, three, or more lines.

A microprocessor 132 communicates with the user-operable control 126, for example through a line 134. A memory 138, which stores and retains data, for example a non-volatile memory, communicates with the microprocessor 132 through a line 140 which may be a dedicated channel of one or many conductors, or a system bus, or other suitable communication channel. The memory 138 may comprise one or more of non-volatile memory cells, electrically reprogrammable memory cells, volatile memory, volatile memory with power backup, or other data storage elements.

The microprocessor 132 communicates with the off-hook signal unit 106 through a line 142, with the switch 118 through a line 144, and with the interface module 104 through a line 146. In some embodiments a FAX tone CNG detect module 148 communicates with the microprocessor 132 through a line 150 and with the interface module 104 through a line 152, and speech processor module 154, which may be used for providing an outgoing message (OGM), communicates with the microprocessor 132 through a line 156 and with the interface module 104 through a line 158. Any or all of the communication channels shown as single lines may be separate single- or multi-channel conductors or part of a system bus or other communication channel.

A power supply 160 which may comprise a battery, or which may connect to the power mains through a plug set 162, or which may include both a rechargeable battery and a power mains connection, provides operating power such as 3 volts D.C., 5 volts D.C., or 12 volts DC to the various components.

The microprocessor 132, responsive to the user control, stores in the memory 138 data indicative of blocked telephone numbers, exchanges, area codes, and predefined lists of numbers. The memory may include names corresponding with numbers to be blocked.

Numbers designated as VIP, after-hours, or privileged, and data indicative of business operating hours, may be stored in the memory 138.

The microprocessor 132 is responsive to an incoming call received through the interface module 104 from the input port 102 to compare the stored data with caller ID data in the incoming call. If the caller ID data matches a blocked caller, the microprocessor 132 blocks the incoming call by causing the off-hook circuit 106 to send an off-hook signal to the input port 102, waiting a predefined interval of time, in some embodiments 8 seconds, and then causing the off-hook circuit 106 to send an on-hook signal to the input port 102. If the caller ID data does not match a blocked caller, the microprocessor 132 causes the switch 118 to connect the input port 102 to the output port 110 either directly or through one or more of the interface module 104 and the ring & tone generator module 120.

Some embodiments include a Bluetooth module 164 in communication with the microprocessor 132, for example through a line 166.

Figure 2:
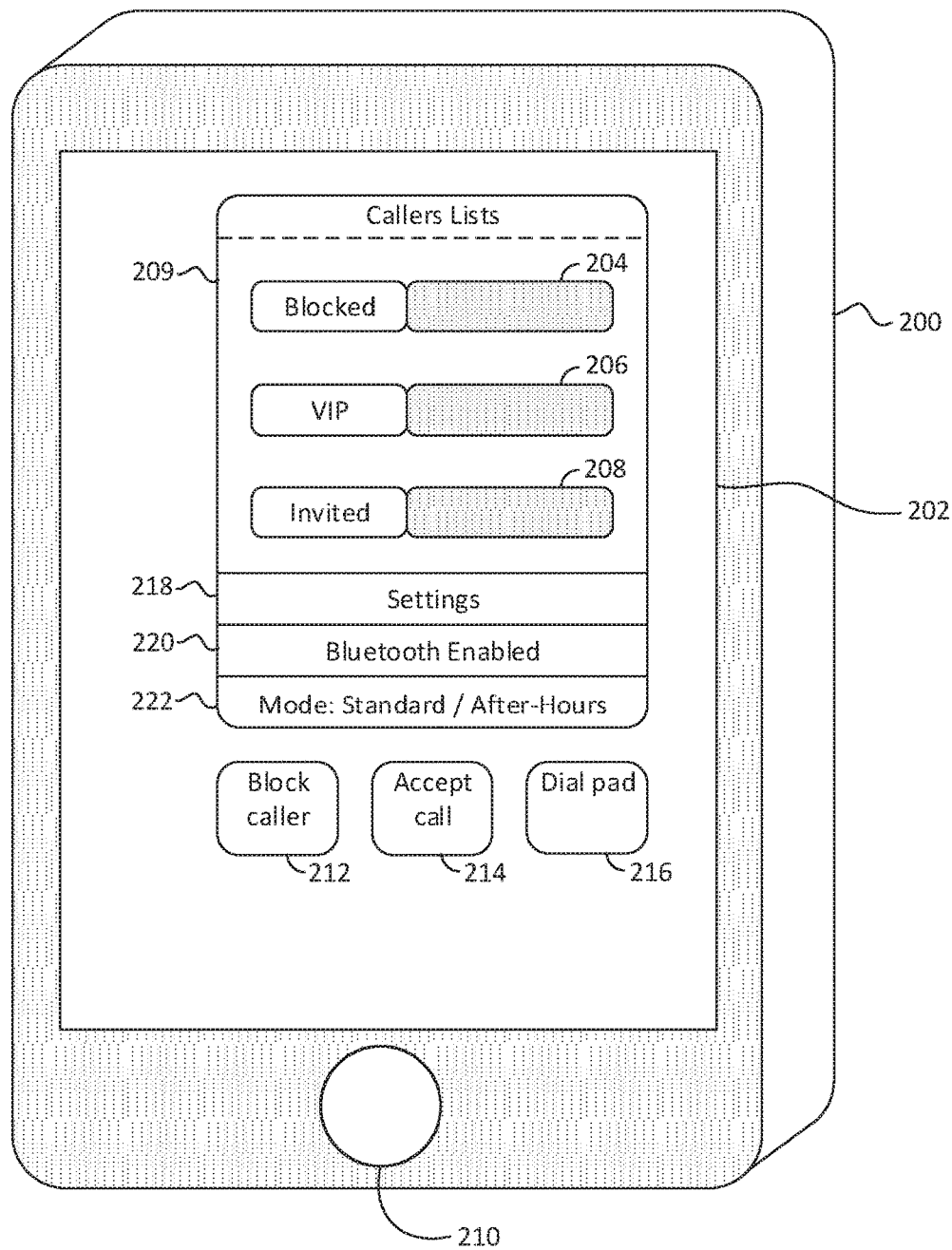
FIG. 2 is a perspective view of a cell phone displaying an app for use with the embodiment shown in FIG. 1.

FIG. 2 illustrates a user control implemented in an app in a cell phone (mobile phone) 200. The cell phone 200 has a touch-sensitive screen 202 displaying areas 204, 206, and 208 through which a user may input data, for example in a "callers list" portion 209 of the screen 202. A general control button 210 is typically part of the cell phone.

In some embodiments area 204 may receive names, numbers, exchanges, or area codes of callers to be blocked. Area 206 may receive names, numbers, exchanges, or area codes to be designated as VIP callers, and area 208 may receive names, numbers, exchanges, or area codes to be designated as invited callers. "Invited" callers may be all callers not otherwise identified or may be a special list of callers having privileges as specified by the user. Other areas of the screen 202 may be provided for retrieving data from the memory, deleting numbers, adding callers in other categories, and the like. in some embodiments an area 212 may be touched to add the caller ID of a caller to be blocked while the call is in progress. An area 214 may be touched to accept a call, and an area 216 may call up a dial pad. Still other areas 218 may call up a settings menu, 220 may enable Bluetooth operation, and 222 may control the mode of operation (standard, business after-hours, etc.).

The mobile phone 200 communicates with the system 100 through the Bluetooth module 164. If the user is away and calls, the microprocessor may respond to the user's own caller ID data by enabling the user to remotely store and delete numbers and exercise other control over the system including for example full duplex communication with the landline connected to the system.

In some embodiments, when the microprocessor 132 couples the input port 102 to the output port 110, the microprocessor 132 temporarily stores the caller ID data as it is received. Then, after one ring signal has passed through to the output port 110, the microprocessor 132 causes the switch 118 to disconnect the input port 102 from the output port 110 just long enough for the microprocessor 132 to send the stored caller ID data to the output port 110, and then the connection is reestablished before the next ring signal arrives. The appearance of this to the telephone device connected to the output port 110 is the same as if the caller ID data had arrived between the first and second rings. The device can thereupon display the caller ID to the user even though the caller has already been identified as not being blocked.

If the caller ID data matches a telephone number that has been identified as privileged, the call may be processed in accordance with a predefined protocol; for example, this may involve connecting the call to a preselected telephone device.

The microprocessor 132 may respond to a FAX identification code, received for example while playing an outgoing message, to route any FAX call to the FAX machine jack. This may be done for all incoming FAX calls or only for FAX calls from numbers that are not blocked or that are designated as VIP or after-hours.

Off-Hook Driver

Figure 3:
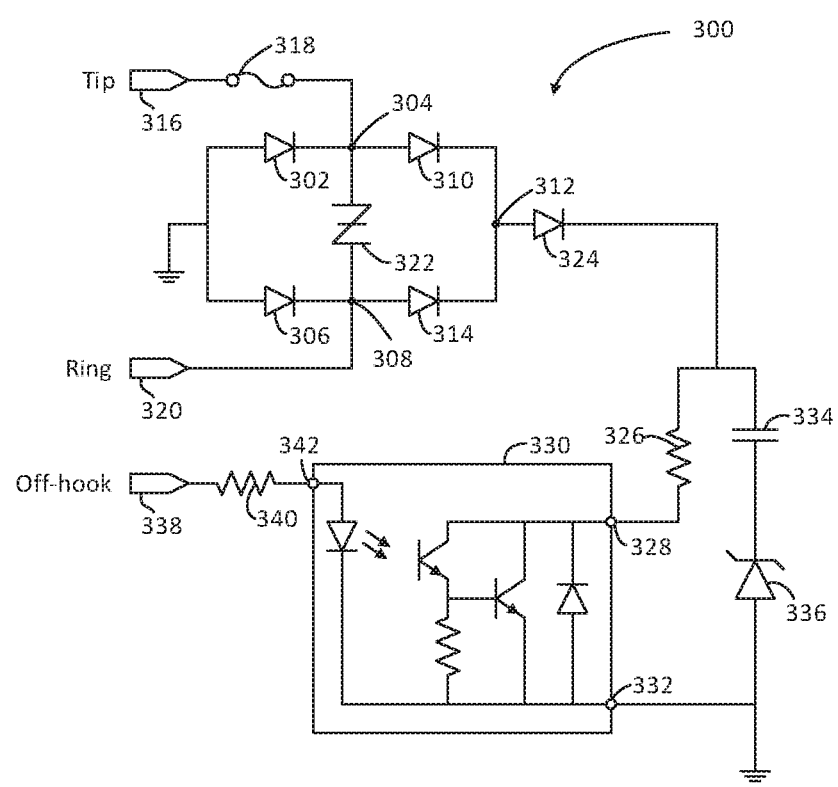
FIG. 3 is a schematic of the off-hook signaling circuit of FIG. 1.

As shown in FIG. 3, an embodiment of the off-hook driver 106 has a bridge diode configuration generally 300 includes a first diode 302 with an anode connected to ground and a cathode connected to a node 304, a second diode 306 with an anode connected to ground and a cathode connected to a node 308, a third diode 310 with an anode connected to the node 304 and a cathode connected to a node 312, and a fourth diode 314 with an anode connected to the node 308 and a cathode connected to the node 312. A TIP part 316 of the input telephone line connects through a fuse 318 to the node 304. A RING part 320 of the input telephone line connects to the node 308. A trisil 322 is connected closely between TIP 318 and RING 320 so as to prevent propagation of transient voltages through the bridge diode configuration 300. An anode of a fast-recovery diode 324 is connected to the node 312 and a cathode of the fast-recovery diode 324 is connected through a resistor 326 to an output 328 of a Darlington photo-isolator 330. A common return 332 of the photo-isolator 330 is connected to ground. A capacitor 334 is connected between the anode of the fast-recovery diode 324 and an anode of a Zener diode 336. A cathode of the Zener diode 336 is connected to ground. An off-hook input 338 is connected through a resistor 340 to an input 342 of the photo-isolator 330.

The diodes 302, 306, 310, and 314 are conventional diodes, for example type 1N4004. The fast-recovery diode 324 may be for example a type RFN2L6STE. The Zener diode 336 may be for example a type 1N4735A.

The value of the capacitor 334 in some embodiments is 0.68 µfd and its voltage rating is 500V. This voltage must be high enough to withstand anticipated surges. In some embodiments the resistor 326 is 620 ohms. The fuse should be able to withstand a momentary 1,500-volt surge.

The trisil 322 may be for example a SIDACTOR Bourns TISP 4350H3 or Littelfuse P3100GALRP(P31B) both rated for 275 Volts A.C. The latter is manufactured by Littelfuse, Inc. of Chicago Ill. Similar trisils may be obtained from STMicroelectronics of Fairport N.Y. or from Bourns, Inc. of Riverside Calif.

TIP and RING are the two line conductors from the telephone central office. The telephone central office maintains TIP at about +48 volts DC with respect to RING, and these float with reference to ground. When the phone is on hook, it presents a high impedance across TIP and RING. When the phone is taken off hook, it presents a low impedance, thereby signaling the telephone central office that the phone has been taken off the hook, and this causes the DC voltage to drop to around 6 volts.

When it is desired to signal the telephone central office that an off-hook condition is present, a HI signal is applied to the off-hook input 338, causing the output 328 of the photo-isolator 330 to go to ground potential. This causes the node 322 to also go to ground potential. The effect is to provide a low impedance path from the TIP connection 316 to the RING connection 320 through the diodes 304 and 324, the resistor 326, the photo-isolator 330, and (through ground) the diode 306. This low impedance path is interpreted by the telephone central office as an off-hook condition. When the HI signal is removed from the off-hook input 328, the low-impedance path between TIP and RING ceases to exist, and this is interpreted by the telephone central as an on-hook condition.

Protection against voltage surges on the telephone line, which may be induced, for example, by nearby lightning strikes, is provided by the trisil 322 and by the high voltage capacitor 334 and the Zener diode 336.

PSTN protection may be provided by components illustrated in FIG. 3 by routing connections from the input port 102 through the off-hook circuit 106 to the interface module 104 rather than directly from the input port 102 to the interface module 104.

Caller ID Delivery

Caller ID may be received from the telephone central office in frequency-shift keying (FSK) or dual tone multi-frequency (DTMF) formats. Worldwide, the majority of telephone systems use FSK, but DTMF is used in some countries in Asia, Europe, and South America. Different countries, different telephone companies within a country, and even different local exchanges may use any of a number of different encodings within either FSK or DTMF.

Figure 4:
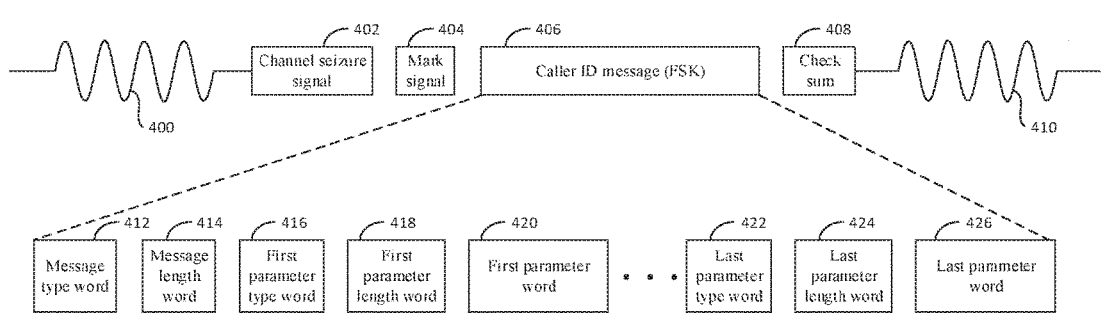
FIG. 4 is a graphic display of an incoming telephone call signal showing Caller ID in FSK format.

A typical FSK encoding is shown in FIG. 4. After a first ring signal 400 is sent from the telephone central office, there is a pause and then a channel seizure signal 402 is sent. After another pause, a mark signal 404 is sent, followed by another pause and then a caller ID message 406. After a pause, a check sum 408 is sent, and after yet another pause a second ring signal 410 is sent. A ring signal typically lasts about two seconds with a four second pause between ring signals. Thus, all of the caller ID signal must be sent in less than four seconds.

The caller ID message 406 contains the actual data that identifies the caller. In one encoding system, this message includes a message type word 412; a message length word 414; a first parameter type word 416; a first parameter length word 418; a first parameter word 420; additional parameter type words, parameter length words, and parameter words (not shown); a last parameter type word 422; a last parameter length word 424; and a last parameter word 426.

Figure 5:
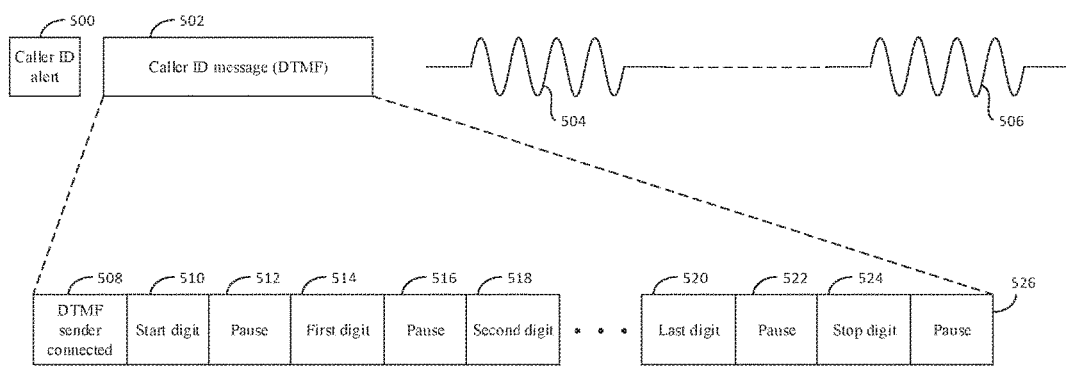
FIG. 5 is a graphic display of an incoming telephone call signal showing Caller ID in DTMF format.

In DTMF the caller ID may be sent before the first ring. A typical DTMF encoding is shown in FIG. 5. A caller ID alert 500 is sent, followed by a DTMF data stream 502 that contains the actual data that identifies the caller. The DTMF data stream 502 is followed by a pause, a first ring signal 504, a pause and a second ring signal 506, and then more ring signals.

The DTMF data stream may include a DTMF sender connected word 508, a start digit 510, a pause 512, a first digit 514, a pause 516, a second digit 518, more pauses and digits (not shown), a last digit 520, a pause 522, a stop digit 524, and a pause 526.

Caller ID Regeneration

As briefly discussed above, when an incoming call arrives, the first ring does not reach any telephone device. Instead the caller ID data, whether in FSK or DTMF format, is temporarily stored, for example in the microprocessor's own electrically erasable memory. After decoding the caller ID data and comparing it with the stored blocked and other numbers, if the microprocessor determines that the call from the input port 102 should be sent through the switch 118 to the output port, the switch connects the input port 102 to the output port 110 for one ring. Then the output port 110 is switched to the microprocessor's local data bus, in this example indicated by the line 144, and the microprocessor sends the stored caller ID data to the output port 110 so the user can see who is calling. Then the output port is switched back to the input port to receive subsequent rings and the call itself when the user answers the call.

Automatic Call Blocking and Routing Methods

Figure 6:
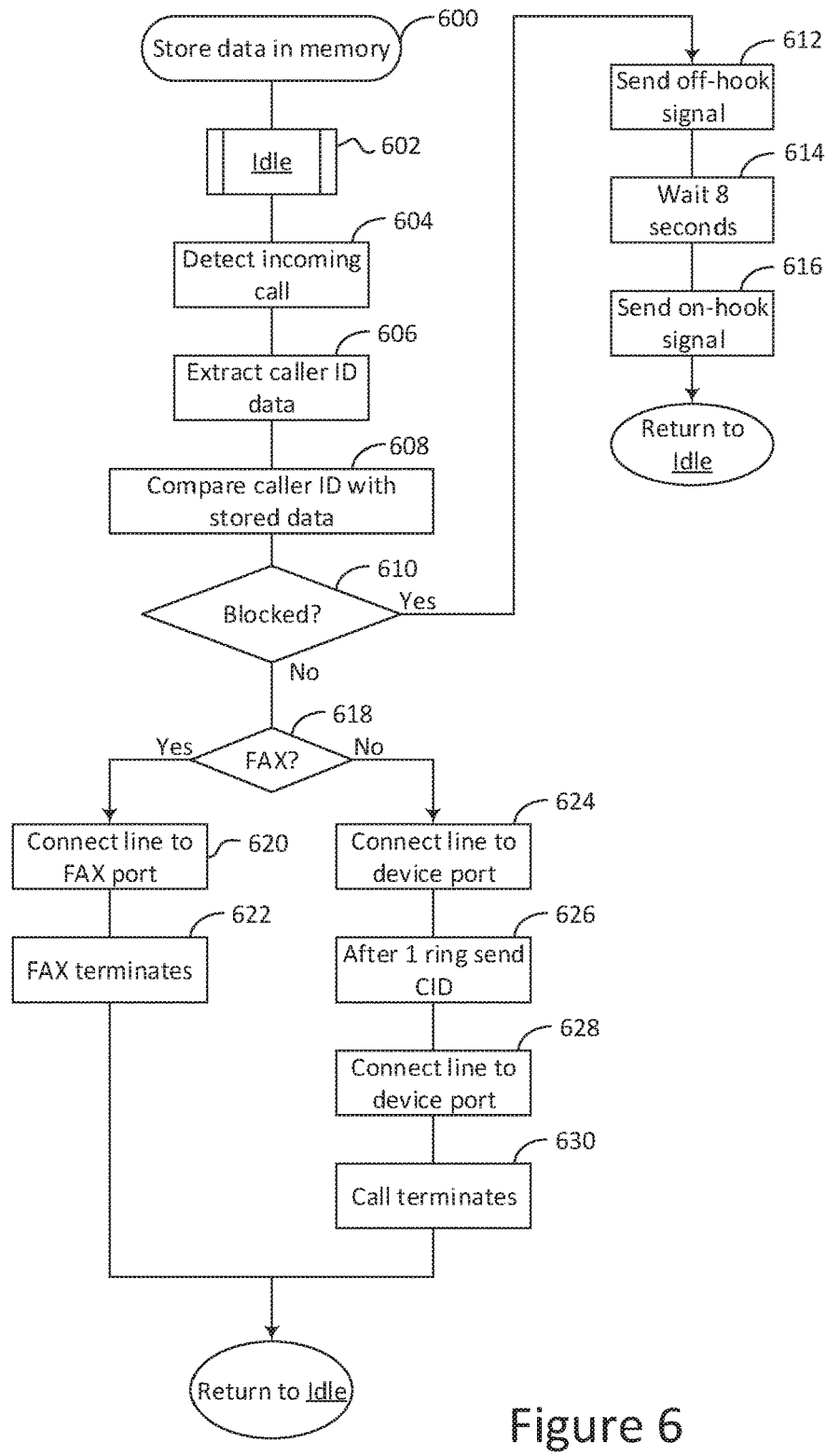
FIG. 6 is a flowchart of an embodiment of an automatic call blocking and routing method.

A method of automatically blocking and routing incoming telephone calls is illustrated in flowchart form in FIG. 6. The method begins with storing data indicative of blocked numbers, names, exchanges, and area codes (600). In some embodiments data indicative of VIP callers, after-hours callers, privileged callers, and predefined business hours may be stored. Then the method in idle status monitors a telephone line (602), When an incoming call is detected (604), caller ID data is extracted (606) and compared with the stored data (608). If the caller ID data matches one of the blocked callers (610) the call is blocked by sending an off-hook signal (612), waiting a predefined interval of time, in some embodiments 8 seconds (614) and then sending an on-hook signal (616). Then the method returns to idle (602).

If the caller ID data does not match one of the blocked callers (610), if the incoming call includes a FAX tone CNG signal (618), the call is routed to a FAX machine (620) and when the FAX transmission terminates (622) the method returns to idle (602). If the call is not a FAX call (618), the call is connected to a telephone device such as a handset (624). Some embodiments include temporarily storing the caller ID data and after one ring goes through the telephone device is disconnected and the stored caller ID data is sent to the device (626), and then the device is reconnected (628). When the call terminates (630) the method returns to idle (602).

Figure 7A:
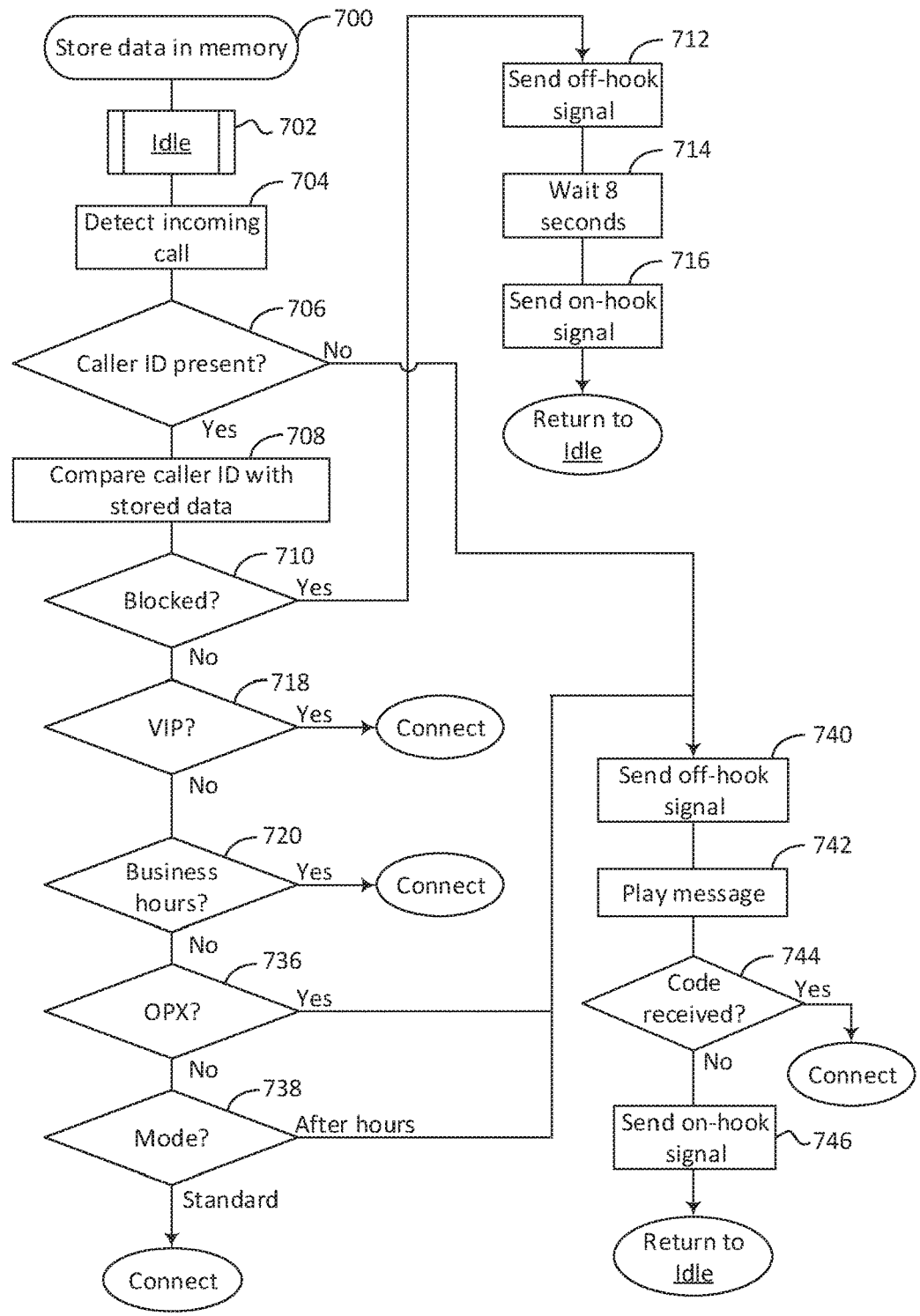
FIGS. 7A and 7B depict a flowchart of another embodiment of an automatic call blocking and routing method.
Figure 7B:
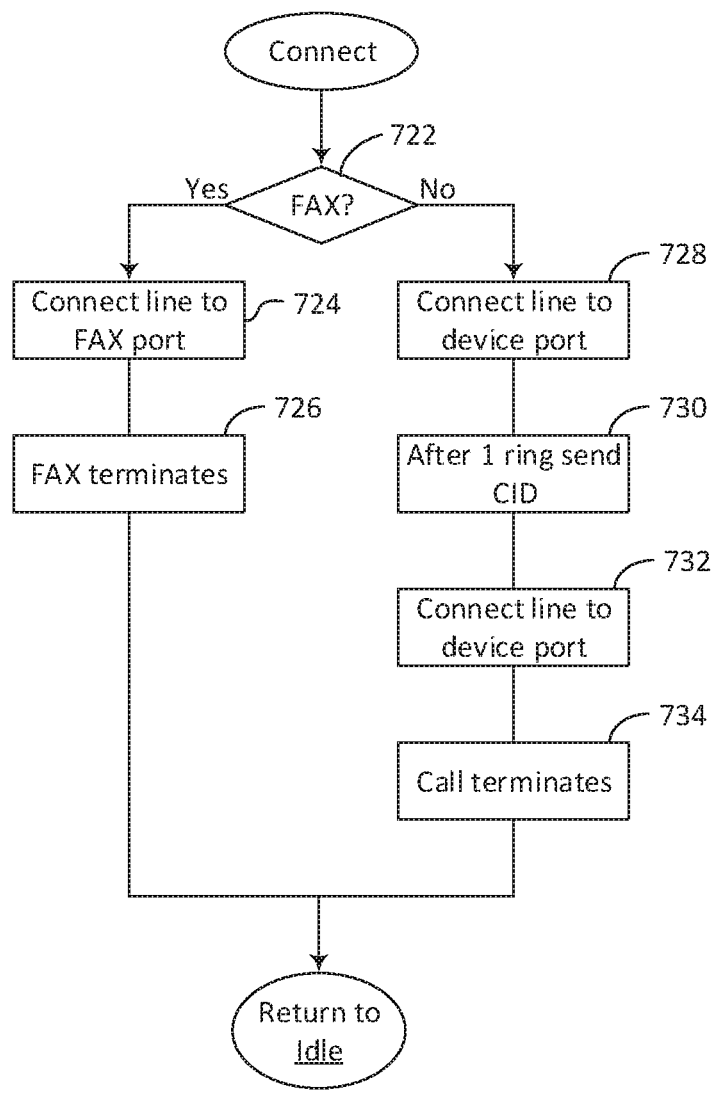

Another embodiment of a method of automatically blocking and routing incoming telephone calls is illustrated in FIGS. 7A and 7B. The method begins with storing data indicative of blocked callers, VIP callers, after-hours callers, and predefined business hours (700). In idle mode (702) a telephone line is monitored. When an incoming call is detected (704), if caller ID data is present (706) it is extracted and compared with the stored data (708). If the caller ID data matches one of the blocked callers (710), the call is blocked by sending an off-hook signal (712), waiting a predefined interval of time (714), and then sending an on-hook signal (716). Then the method returns to idle (702).

If the caller ID data matches a VIP caller (718), the call is connected. If the method is operating in a business mode during business hours (720), even if the call is an OPX (Out of area, Private, or X for unknown) call—that is, has no number caller ID data, only a telephone company special parameter type such as O for Out of area, P for Private, or X for Unknown types—(706), the call is connected. In other modes, OPX calls are blocked by default as if their individual caller ID had been stored as blocked calls.

When the call is connected, if the call includes a FAX tone CNG signal (722), the call is routed to a FAX machine (724) and when the FAX transmission terminates (726) the method returns to idle (702). If the call is not a FAX call (722), the call is connected to a telephone device such as a handset (728). Some embodiments include temporarily storing the caller ID data and after one ring goes through the telephone device is disconnected and the stored caller ID data is sent to the device (730), and then the device is reconnected (732). When the call terminates (734) the method returns to idle (702).

Otherwise, in some embodiments if the call is an OPX call (736) or if the method is operating in business mode outside of business hours (738), an off-hook signal may be sent (740) and a prerecorded outgoing message (OGM) may be played (742). In some embodiments if the caller ID is not present (706) the off-hook signal is sent (740) and the prerecorded OGM is played (742). In some embodiments if the method is operating in business mode outside of business hours (738), an off-hook signal may be sent (740) or the call may be sent to voice mail. In some embodiments, if the caller sends a pre-arranged code, for example an extension number (744), the call is connected. Otherwise an on-hook signal is sent (746) terminating the call, and the method returns to idle (702).

Following the above sequence, if the call has not yet been disposed of, and since the call has neither been blocked nor identified as OPX, it must be an invited call. Since at this point the method is operating in a standard mode rather than a business mode (720 and 738), the call is connected.

Storing data may include displaying an item of data responsive to a find-data command from a user. Storing data may include storing a predetermined quantity of data and if more data are presented for storage, deleting some of the predetermined quantity of data to make room for the more data on a first-in-first-out basis. Or some of the data may be stored as permanent data which may only be modified or deleted with a special command.

Another embodiment of a method of automatically blocking and routing incoming telephone calls is illustrated in FIGS. 8A through 8G. The code references in FIGS. 8A through 8G refer to the following list of codes that the user enters to indicate a desired course of action. For example, the user might enter code 18 to indicate that voicemail is to be turned ON.

01 English
02-03 Reserved
04 PIN Code entry
05 OGM1 (outgoing message 1)—factory recording
06 OGM2 user recording
07 OGM3 user recording (call forward notification)
08 Factory OGM playback
09 User OGM2 playback
10 User OGM3 playback
11 Select factory OGM playback for main greeting
12 Select user OGM2 playback for main greeting
13-15 Reserved
16 FSK caller ID Method
17 DTMF caller ID Method
18 Option for voicemail ON
19 Option for voicemail OFF
20 Spoofing exchange call block set
21 Spoofing exchange call block list readout
22 Change port access codes
23 Port codes readout [port code 1=1, port code 2=2, port code 3=3]
24-26 Reserved
27 Set LCD time On
28 Enable LED On
29 Disable LED
30 Standard mode
31 Business mode
32 Standby mode
33 Select mode
34-37 Reserved
38 Barge-in protection On
39 Barge-in protection Off
40 Blocked callers list entry
40 ### Find stored block number
40 #* Delete blocked list that is not preferred
41 Blocked caller list readout
42 Block dialed outbound number
43 Blocked dialed outbound number list
44 Name block readout
45 Reserved
46 Number block auto delete On
47 Number block auto delete Off
48 Name block private On
49 Name block private Off
50 Invited callers list entry
51 Invited callers list readout
52 Invited callers within a blocked area code entry
53 Invited callers list within a blocked area code readout
54 Invited fax call list entry
55 Invited fax call list readout
56 OPX fax hang-up On
57 OPX hang-up Off
58 Name block out of area On
59 Name block out of area Off
60 VIP callers list entry
61 VIP callers list readout
62 Call forwarding On
63 Call forwarding Off
64 Ring bypass enable
65 Ring bypass disable
66 Reserved
67 Store call forward number
68 Hang up call after OGM detected enable (stop call)
69 Hang up call after OGM detected disable (process call)
70 Suppress 1st ring
71 Pass thru 1st ring
72 Route incoming calls to OGM
73 OPX calls hung up
74 Pass thru private calls as Invited
75 Private calls are OPX
76 Pass thru out of area calls as invited
77 Out of area calls are OPX
78 OPX calls are invited
79 OPX calls are OGM call processed
80 After hours mode Off
81 After hours mode On
82 Enter start time
83 Enter end time
84 Set Monday-Friday (M-F) On
85 Set M-F Off
86 Saturday-Sunday (Sat-Sun) On
87 Sat-Sun Off
88 Full day AHM On (84 and 86 must be turned on)
89 Full day AHM Off (84 and 86 must be turned on)
90 Dial displayed number
91 Ask for dial 1?
92 Display active code set
93 Routing code for Brazil
94 Reserved
95 Manual time/date setting=95 [yr 2 digits] [mo 2 digits] [day 2 digits] [hr-min (MIL Time)]*
95#* Default to telco CID
96#* Global invite (invite all standardized numbers)
97#* Block all calls except invited codes 51, 53, 54, 61, 74, 76
98 Delete number command=98 [number]*
98#* Delete all stored numbers
99#* Set system back to vendor default FIG. 8A illustrates the method operating in standard mode, in which any caller that is not identified as blocked is allowed to connect. Such callers may be termed "invited" callers and by default all callers are invited except those that are blocked.

FIG. 8B illustrates the method operating in business mode during business hours, and FIG. 8C illustrates the method operating in after-hours mode. During business hours as designated by the user, all calls except blocked calls are allowed to connect. After hours, only calls from VIPs and from designated after-hours callers are allowed to connect. Other non-blocked callers, and callers that cannot be identified, are played a prerecorded outgoing message. Some or all of such callers may be afforded an opportunity to enter a code such as an extension number, and if the caller enters a correct code, the call is connected, typically to a specific telephone device identified by the code.

FIG. 8D illustrates standby mode, in which the method becomes inoperative and all calls are allowed to connect except for blocked callers. FIG. 8E illustrates a call progress monitor. FIG. 8F illustrates remote and local access programming. FIG. 8G illustrates select mode in which VIP callers and callers designated as Select are allowed to connect.

The embodiments described and illustrated herein are exemplary but are not to be construed as limiting. The system may be practiced with other circuit components. The steps of the method may be performed in a different order, and other steps may be included. The system and method are to be limited only by the claims.

The invention claimed is:

1. An automatic call blocking and routing system comprising:
    an input port;
    a telephone line interface (Subscriber Line Interface Card/SLIC) in communication with the input port;
    an off-hook circuit including an overvoltage protection trisil connected across the input port and a series-connected fast-recovery diode, capacitor, and Zener diode in overvoltage-protecting communication with the input port;
    an output port;
    a switch in communication with the input port and the output port;
    a memory;
    a user-operable control; and
    a microprocessor responsive to the user-operable control to store in the memory data indicative of blocked callers;
    the microprocessor responsive to an incoming call received from the input port through the telephone line interface to compare the stored data with caller ID data in the incoming call and
    if the caller ID data matches a blocked caller, to block the incoming call by causing the off-hook circuit to send an off-hook signal to the input port, waiting a predefined interval of time, and then causing the off-hook circuit to send an on-hook signal to the input port, and
    if the caller ID data does not match a blocked caller, to cause the switch to connect the input port to the output port,
    wherein the off-hook circuit comprises a Darlington photo-isolator having a photosensor and a transistor in a Darlington connection in which a collector of the photosensor and a collector of the transistor are connected together and an emitter of the photosensor is connected to a base of the transistor, the transistor in communication with the input port through the fast-recovery diode, the Darlington photoisolator having an input connected to receive off-hook and on-hook signals from the microprocessor.

2. The system of claim 1 wherein causing the switch to connect the input port to the output port comprises temporarily storing the caller ID data in the memory; if the caller ID data does not match a blocked caller:
    causing the switch to connect the input port to the output port;
    after one ring causing the switch to disconnect the input port from the output port;
    sending the stored caller ID data to the output port; and
    causing the switch to again connect the input port to the output port.

3. The system of claim 1 wherein data indicative of blocked callers includes names that may be designated as blocked callers.

4. The system of claim 1 and further comprising a Bluetooth module in communication with the microprocessor, and wherein the user-operable control comprises an app in a mobile phone, the app enabling the user to send blocked-caller data through the mobile phone and the Bluetooth module to the microprocessor.

5. The system of claim 4 wherein the app enables the user to control the system and receive calls in full duplex mode at the mobile phone through the Bluetooth module.

6. The system of claim 1 wherein the output port comprises both a telephone device connector and a FAX machine connector and wherein the microprocessor is responsive to a FAX CNG signal in the incoming call to cause the switch to connect the input port to the FAX machine connector.

7. The system of claim 1 and further comprising a ring generator and ring tone generator module in communication with the output port.

8. The system of claim 1 wherein, if the caller ID data indicates that the call is Out of Area (O) or Private (P), or if the caller ID data does not include the telephone number of the caller (X), the microprocessor blocks the incoming call by causing the off-hook circuit to send an off-hook signal to the input port, waiting a predefined interval of time, and then causing the off-hook circuit to send an on-hook signal to the input port.

9. The system of claim 1 wherein the microprocessor is responsive to a Select Mode command entered through the user-operable control to play an outgoing message (OGM) if the caller ID data indicates that the call is Out of Area (O) or Private (P), or if the caller ID data does not include the telephone number of the caller (X) and to connect the incoming call if a code is provided in the incoming call.

10. The system of claim 1 wherein the photosensor and the transistor in the Darlington connection are contained within a single chip.

11. An automatic call blocking and routing system comprising:
    an input port;
    a telephone line interface (Subscriber Line Interface Card/SLIC) in communication with the input port;
    an off-hook circuit including an overvoltage protection trisil connected across the input port and a series-connected fast-recovery diode, capacitor, and Zener diode in overvoltage-protecting communication with the input port;
    an output port;
    a switch in communication with the input port and the output port; a memory;
    a user-operable control; and
    a microprocessor responsive to the user-operable control to store in the memory data indicative of blocked callers, VIP callers, after-hours callers, and predefined business hours;
    the microprocessor responsive to an incoming call received from the input port through the telephone line interface to compare the stored data with caller ID data in the incoming call; and
    if the caller ID data matches a blocked caller, to block the incoming call by causing the off-hook circuit to send an off-hook signal to the input port, waiting a predefined interval of time, and causing the off-hook circuit to send an on-hook signal to the input port;
if the caller ID data matches a VIP caller, to cause the switch to connect the input port to the output port;
if the incoming call occurs during the predefined business hours, to cause the switch to connect the input port to the output port; and
if the incoming call occurs outside the predefined business hours, to play a prerecorded outgoing message (OGM) to the input port,
wherein the off-hook circuit comprises a Darlington photo-isolator having a photosensor and a transistor in a Darlington connection in which a collector of the photosensor and a collector of the transistor are connected together and an emitter of the photosensor is connected to a base of the transistor, the transistor in communication with the input port through the fast-recovery diode, the Darlington photo-isolator having an input connected to receive off-hook and on-hook signals from the microprocessor.

12. The system of claim 11 wherein if the incoming call occurs outside the predefined business hours and either (a) the caller ID data matches an after-hours caller or (b) the incoming call has no caller ID data, the microprocessor is responsive to a code provided in the incoming call to cause the switch to connect the input port to the output port.

13. The system of claim 11 wherein causing the switch to connect the input port to the output port comprises temporarily storing the caller ID data in the memory; and, if the caller ID data does not match a blocked caller:
   causing the switch to connect the input port to the output port;
   after one ring causing the switch to disconnect the input port from the output port;
   sending the stored caller ID data to the output port; and
   causing the switch to again connect the input port to the output port.

14. The system of claim 11 wherein data indicative of blocked callers, VIP callers, and after-hours callers includes names that may be designated as blocked, VIP, or after-hours callers.

15. The system of claim 11 and further comprising a Bluetooth module in communication with the microprocessor, and wherein the user-operable control comprises an app in a mobile phone, the app enabling the user to send blocked caller, VIP caller, and after-hours caller data through the mobile phone and Bluetooth module to the microprocessor.

16. The system of claim 15 wherein the app enables the user to control the system and receive calls in full duplex mode at the mobile phone through the Bluetooth module.

17. The system of claim 11 wherein the output port comprises both a telephone device connector and a FAX machine connector and wherein the microprocessor is responsive to a FAX CNG signal in the incoming call to cause the switch to connect the input port to the FAX machine connector.

18. The system of claim 11 wherein the microprocessor is responsive to the user-operable control to store in the memory data indicative of special-privilege callers, and wherein a call from a special-privilege caller is connected to a predetermined telephone device through the output port.

19. The system of claim 11 wherein the output port comprises an answering machine port.

20. The system of claim 11 wherein the microprocessor monitors outgoing calls from the output port, compares a number being called with the stored data, and terminates the outgoing call if the number being called matches a blocked number.

21. The system of claim 20 wherein terminating the outgoing call comprises sending a warning beep to the output port.

22. The system of claim 11 and further comprising a ring generator and ring tone generator module in communication with the output port.

23. The system of claim 11 and further comprising, after playing a prerecorded outgoing message (OGM) to the input port, activating a ring generator and ring tone generator in response to a predetermined code received from the incoming call.

24. The system of claim 11 wherein the switch is selected from the group comprising a relay, a solid-state switch, and a MOSFET (Metal-Oxide-Semiconductor Field-Effect Transistor) switch.

* * * * *